(12) United States Patent
Biskeborn et al.

(10) Patent No.: US 8,837,082 B2
(45) Date of Patent: Sep. 16, 2014

(54) MAGNETIC RECORDING HEAD HAVING QUILTED-TYPE COATING

(75) Inventors: Robert G. Biskeborn, Hollister, CA (US); Calvin S. Lo, Saratoga, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/457,916

(22) Filed: Apr. 27, 2012

(65) Prior Publication Data

US 2013/0286500 A1    Oct. 31, 2013

(51) Int. Cl.
| G11B 5/008 | (2006.01) |
| G11B 5/127 | (2006.01) |
| G11B 5/187 | (2006.01) |
| G11B 5/265 | (2006.01) |

(52) U.S. Cl.
USPC ........ 360/122; 360/121; 360/125.73; 360/128

(58) Field of Classification Search
USPC ........ 360/121, 122, 128, 125.72, 125.73, 129
See application file for complete search history.

(56) References Cited

U.S. PATENT DOCUMENTS

| 4,409,633 | A |   | 10/1983 | Watanabe et al. |
|---|---|---|---|---|
| 4,659,606 | A |   | 4/1987 | Wada et al. |
| 4,745,509 | A |   | 5/1988 | Watanabe et al. |
| 4,797,767 | A | * | 1/1989 | Baus, Jr. ........ 360/121 |
| 5,034,838 | A |   | 7/1991 | Brock et al. |
| 5,062,021 | A |   | 10/1991 | Ranjan et al. |
| 5,074,971 | A |   | 12/1991 | Tsuya et al. |
| 5,165,981 | A |   | 11/1992 | Yamakawa et al. |
| 5,209,837 | A |   | 5/1993 | Tsuya et al. |
| 5,264,981 | A |   | 11/1993 | Campbell et al. |
| 5,323,282 | A |   | 6/1994 | Kanai et al. |
| 5,426,550 | A |   | 6/1995 | Mizoh et al. |
| 5,572,391 | A |   | 11/1996 | Ishiwata |
| 5,713,122 | A |   | 2/1998 | Aboaf et al. |
| 5,781,376 | A |   | 7/1998 | Tsukamoto |
| 5,822,153 | A |   | 10/1998 | Lairson et al. |
| 5,831,792 | A |   | 11/1998 | Ananth |
| 5,906,884 | A |   | 5/1999 | Yahisa et al. |
| 5,909,340 | A |   | 6/1999 | Lairson et al. |
| 6,172,858 | B1 |   | 1/2001 | Yoda et al. |
| 6,188,543 | B1 |   | 2/2001 | Terunuma et al. |
| 6,361,837 | B2 |   | 3/2002 | Pangrle et al. |
| 6,365,286 | B1 |   | 4/2002 | Inomata et al. |
| 6,416,839 | B1 |   | 7/2002 | Xuan et al. |
| 6,541,065 | B1 |   | 4/2003 | Sasaki et al. |
| 6,639,753 | B1 | * | 10/2003 | Henze et al. ......... 360/121 |
| 6,650,469 | B2 | * | 11/2003 | Kim et al. ........... 359/363 |

(Continued)

OTHER PUBLICATIONS

Edwards et al., "Flex Vol: Flexible, Efficient File Volume Virtualization in WAFL," USENIX Association, USENIX '08: 2008 USENIX Annual Technical Conference, pp. 129-142.

(Continued)

*Primary Examiner* — Jefferson Evans
(74) *Attorney, Agent, or Firm* — Zilka-Kotab, PC

(57) ABSTRACT

A module according to one embodiment includes a plurality of transducers; a tape bearing surface having a transducer region aligned with the transducers in a tape travel direction, and outer regions flanking the transducer region in a direction perpendicular to the tape travel direction; a first coating on the transducer region of the tape bearing surface; and a second coating on at least one of the outer regions of the tape bearing surface, the second coating being different than the first coating.

23 Claims, 11 Drawing Sheets

(56) References Cited

U.S. PATENT DOCUMENTS

| | | |
|---|---|---|
| 6,690,542 B1 | 2/2004 | Wang |
| 6,757,143 B2 | 6/2004 | Tunayama et al. |
| 6,759,081 B2 | 7/2004 | Huganen et al. |
| 6,813,122 B1 | 11/2004 | Granstrom |
| 6,822,831 B2 | 11/2004 | Ikeda et al. |
| 6,846,434 B2 | 1/2005 | Akselrod |
| 6,849,305 B2 | 2/2005 | Bravo-Vasquez et al. |
| 6,937,435 B2 * | 8/2005 | Saliba ............... 360/122 |
| 7,055,010 B2 | 5/2006 | Lin et al. |
| 7,072,916 B1 | 7/2006 | Lewis et al. |
| 7,225,210 B2 | 5/2007 | Guthrie, II. |
| 7,274,528 B2 | 9/2007 | Hamming et al. |
| 7,281,317 B2 | 10/2007 | Ohno et al. |
| 7,325,296 B2 | 2/2008 | Biskeborn |
| 7,469,465 B2 | 12/2008 | Ding et al. |
| 7,580,227 B2 | 8/2009 | Sato et al. |
| 7,606,844 B2 | 10/2009 | Kottomtharayil |
| 7,676,514 B2 | 3/2010 | Faibish et al. |
| 7,676,904 B2 | 3/2010 | Chau et al. |
| 7,760,465 B2 | 7/2010 | Koeppe |
| 7,870,356 B1 | 1/2011 | Veeraswamy et al. |
| 7,872,833 B2 | 1/2011 | Hu et al. |
| 7,916,424 B2 | 3/2011 | Biskeborn |
| 7,925,622 B2 | 4/2011 | Chapman |
| 8,526,137 B2 | 9/2013 | Biskeborn et al. |
| 2001/0019464 A1 * | 9/2001 | Poorman et al. .............. 360/122 |
| 2002/0018920 A1 | 2/2002 | Yamamoto et al. |
| 2002/0098381 A1 | 7/2002 | Coffey et al. |
| 2002/0141112 A1 * | 10/2002 | Saliba ............... 360/129 |
| 2003/0227716 A1 | 12/2003 | Yamakura et al. |
| 2004/0032696 A1 | 2/2004 | Johnson et al. |
| 2004/0084408 A1 | 5/2004 | Makarov et al. |
| 2005/0110004 A1 | 5/2005 | Parkin et al. |
| 2006/0078683 A1 | 4/2006 | Mukai |
| 2007/0009717 A1 | 1/2007 | Wong |
| 2007/0097560 A1 | 5/2007 | Karr et al. |
| 2007/0109686 A1 | 5/2007 | Jose et al. |
| 2008/0259494 A1 | 10/2008 | Biskeborn |
| 2008/0259499 A1 | 10/2008 | Hu et al. |
| 2008/0266711 A1 | 10/2008 | Nibarger et al. |
| 2009/0052093 A1 | 2/2009 | Kawakita et al. |
| 2009/0244772 A1 | 10/2009 | Sue et al. |
| 2010/0007976 A1 | 1/2010 | Baumgart et al. |
| 2010/0053817 A1 | 3/2010 | Biskeborn et al. |
| 2010/0149685 A1 * | 6/2010 | Yari et al. .............. 360/83 |
| 2010/0269565 A1 * | 10/2010 | Biskeborn et al. .............. 73/7 |
| 2011/0056825 A1 | 3/2011 | Baubet et al. |
| 2011/0090589 A1 | 4/2011 | Biskeborn et al. |
| 2011/0102947 A1 | 5/2011 | Ogawa et al. |
| 2012/0307396 A1 | 12/2012 | Biskeborn et al. |
| 2012/0307397 A1 | 12/2012 | Biskeborn |
| 2014/0059842 A1 | 3/2014 | Biskeborn et al. |
| 2014/0063645 A1 | 3/2014 | Biskeborn et al. |
| 2014/0085748 A1 | 3/2014 | Biskeborn et al. |
| 2014/0087089 A1 | 3/2014 | Biskeborn et al. |

OTHER PUBLICATIONS

Meyer et al., "Parallax: Virtual Disks for Virtual Machines," 2008 ACM, EuroSys '08, Apr. 1-4, 2008, Glasgow, Scotland, UK, pp. 1-14.
Sapuntzakis et al., "Optimizing the Migration of Virtual Computers," Proceedings of the 5th Symposium on Operating Systems Design and Implementation, 2002, pp. 1-14.
U.S. Appl. No. 13/601,068, filed Aug. 31, 2012.
U.S. Appl. No. 13/152,253, filed Jun. 2, 2011.
U.S. Appl. No. 13/624,484, filed Sep. 21, 2012.
U.S. Appl. No. 13/624,466, filed Sep. 21, 2012.
Restriction/Election Requirement from U.S. Appl. No. 13/624,484 dated Aug. 19, 2013.
Non-Final Office Action from U.S. Appl. No. 13/152,253 dated Mar. 28, 2013.
Notice of Allowance and Fee(s) Due from U.S. Appl. No. 13/152,253 dated Jul. 25, 2013.
Non-Final Office Action from U.S. Appl. No. 13/624,484 dated Oct. 15, 2013.
Restriction/Election Requirement from U.S. Appl. No. 13/601,068 dated Jan. 8, 2014.
Non-Final Office Action from U.S. Appl. No. 13/601,068 dated Mar. 6, 2014.
Notice of Allowance and Fee(s) Due from U.S. Appl. No. 13/624,484 dated Mar. 6, 2014.

* cited by examiner

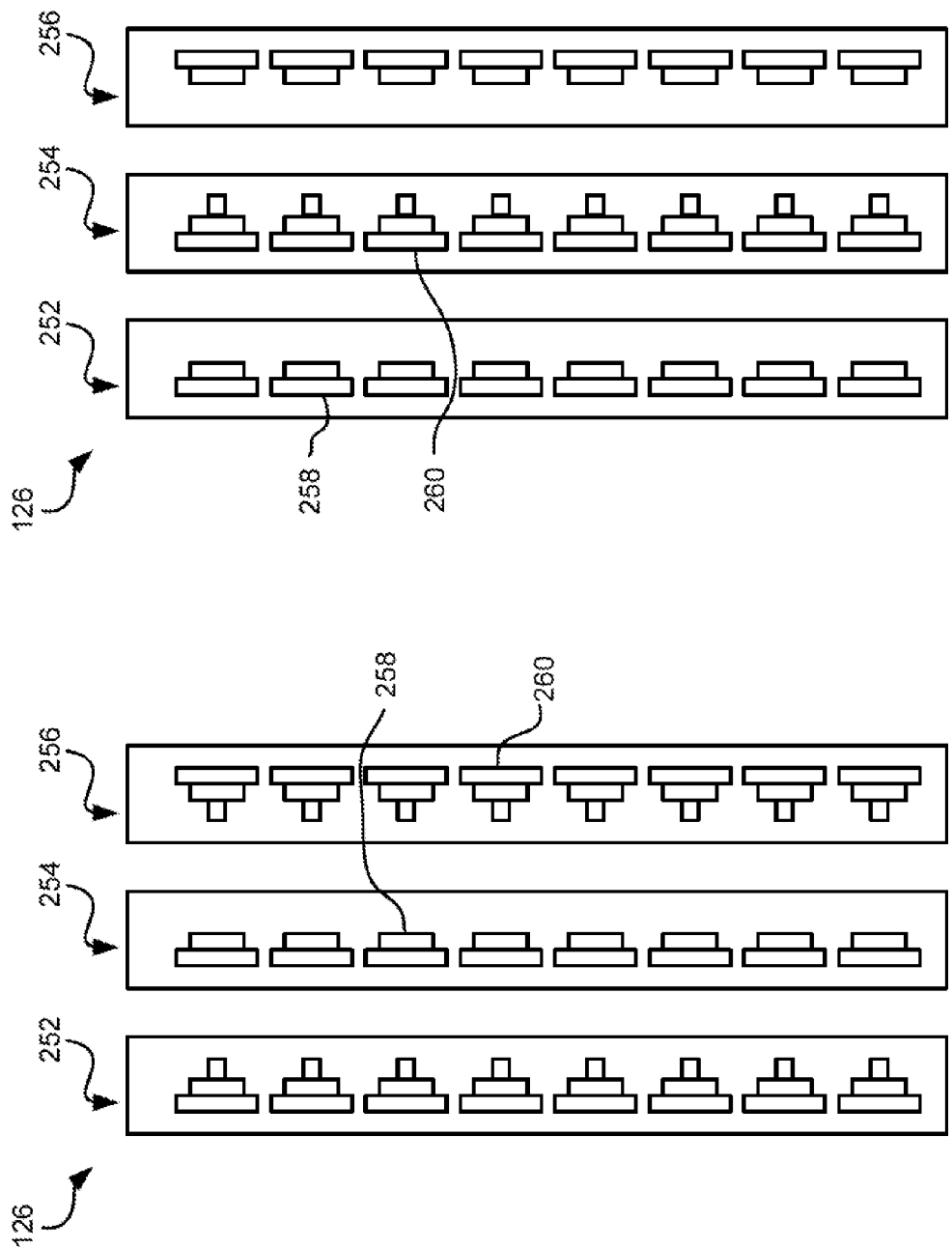

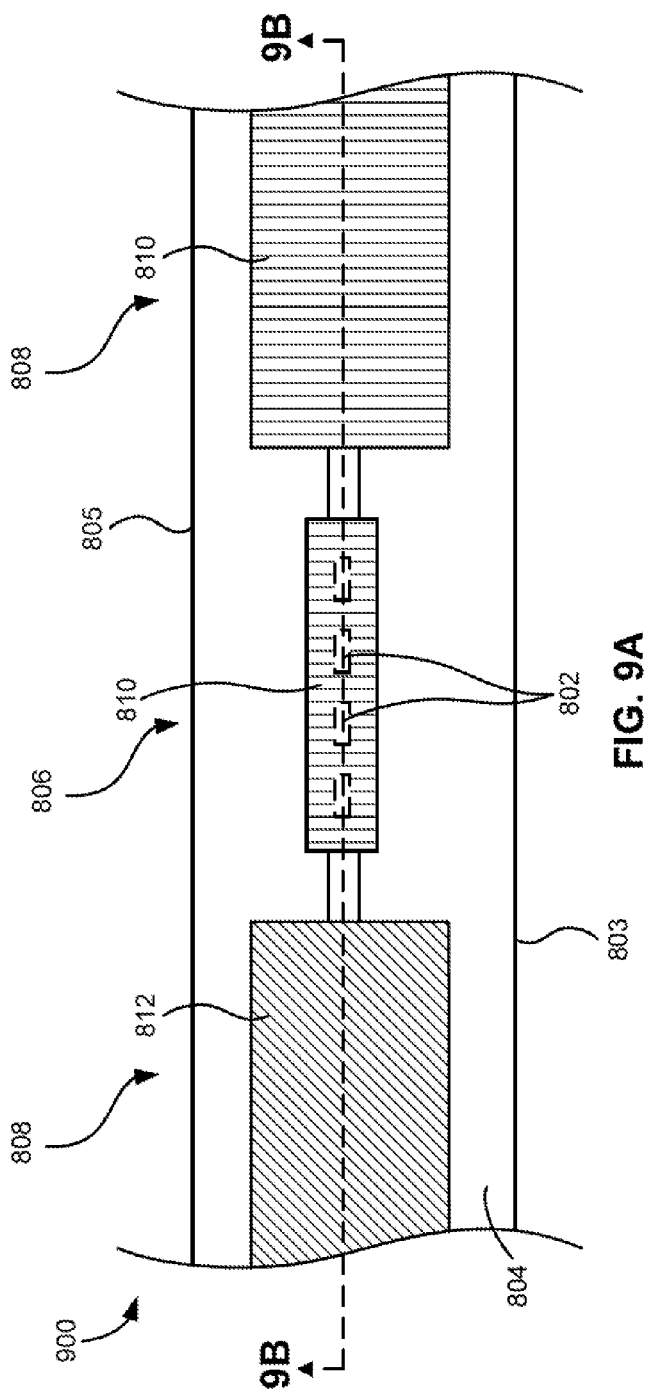
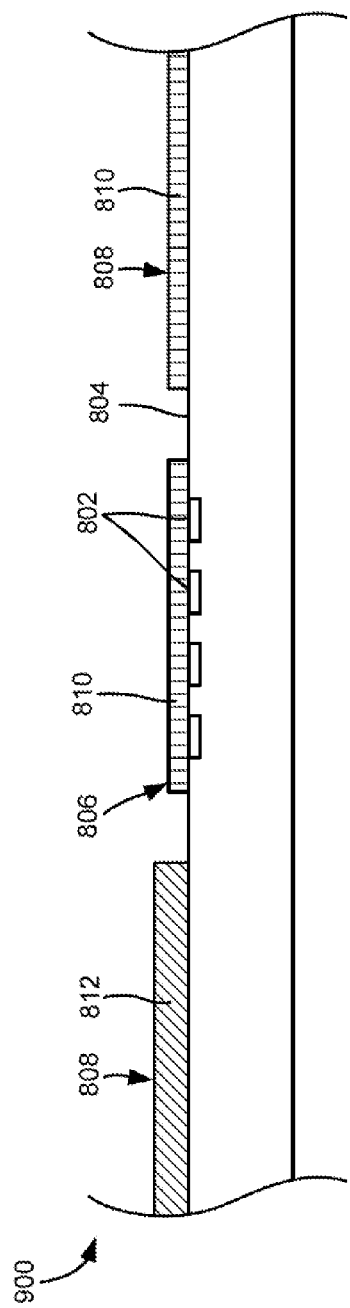

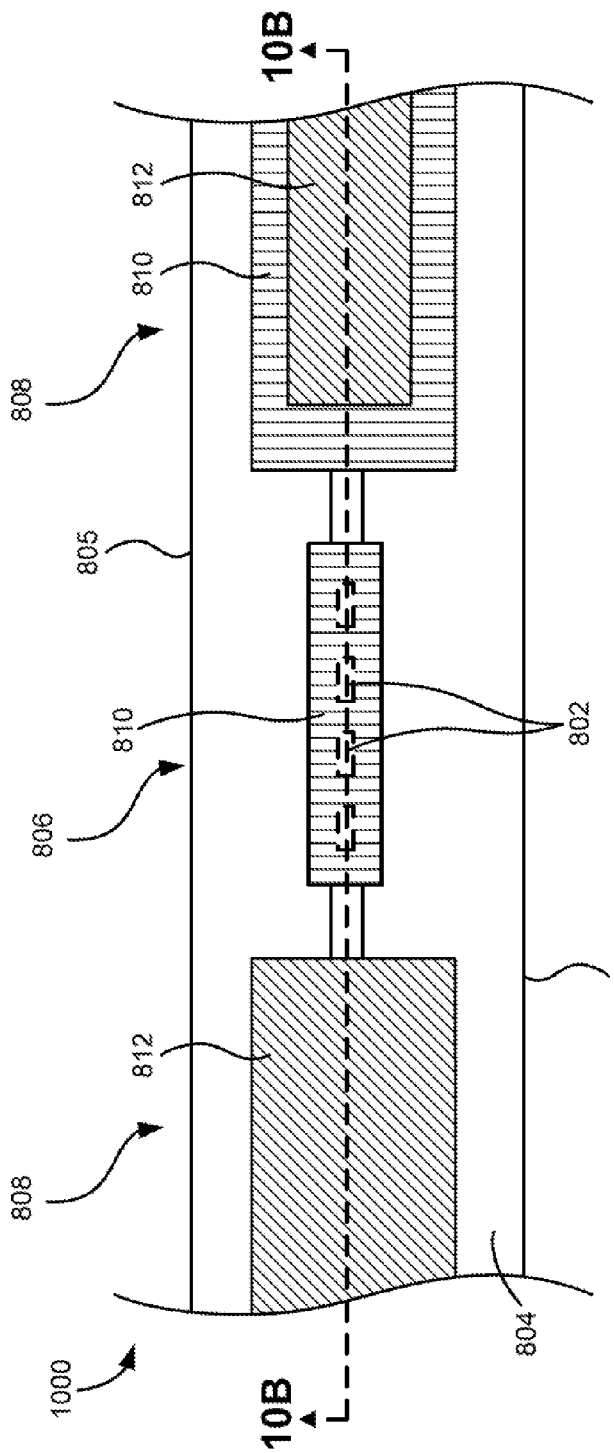
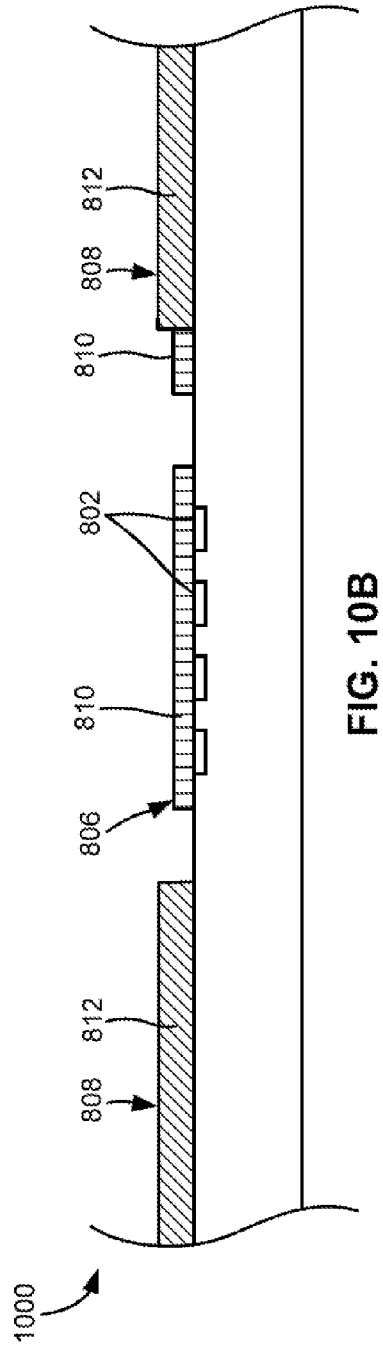
FIG. 10A
FIG. 10B

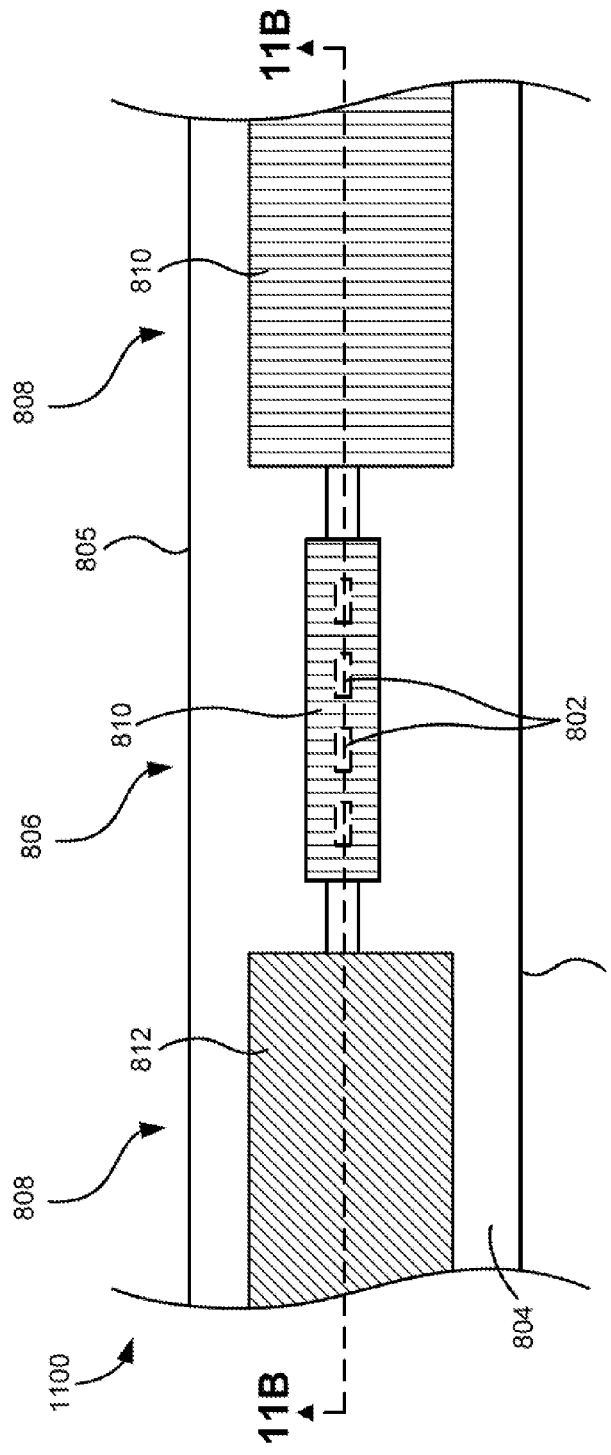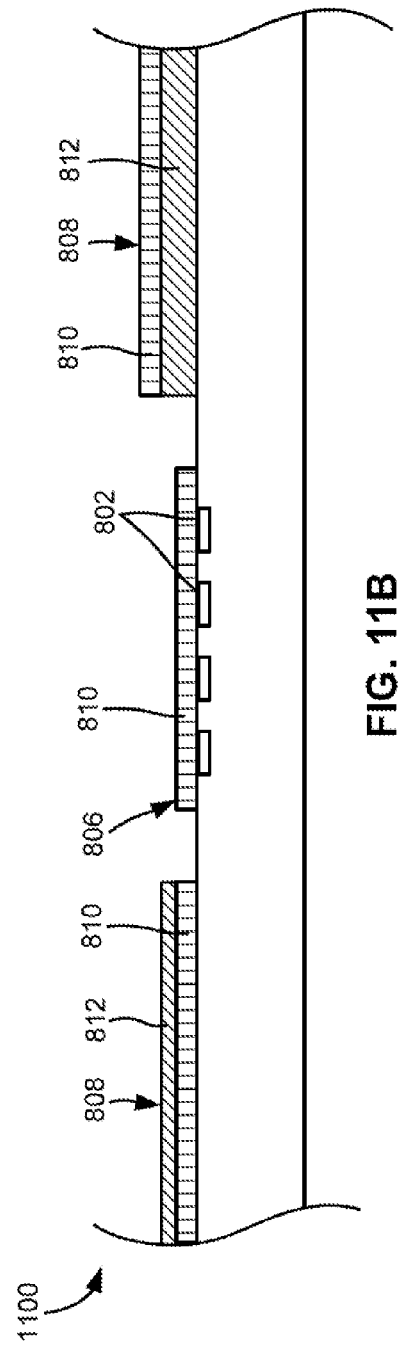
FIG. 11A
FIG. 11B

MAGNETIC RECORDING HEAD HAVING QUILTED-TYPE COATING

BACKGROUND

The present invention relates to data storage systems, and more particularly, this invention relates to the protection of transducers for such data storage systems, e.g., by mitigating friction introduced by the magnetic media thereon.

In magnetic storage systems, data is read from and written onto magnetic recording media utilizing magnetic transducers commonly. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

BRIEF SUMMARY

A module according to one embodiment includes a plurality of transducers; a tape bearing surface having a transducer region aligned with the transducers in a tape travel direction, and outer regions flanking the transducer region in a direction perpendicular to the tape travel direction; a first coating on the transducer region of the tape bearing surface; and a second coating on at least one of the outer regions of the tape bearing surface, the second coating being different than the first coating.

A module according to another embodiment includes a plurality of transducers selected from a group consisting of data readers, servo readers, and data writers; a tape bearing surface having a transducer region aligned with the transducers in a tape travel direction, and outer regions flanking the transducer region in a direction perpendicular to the tape travel direction; a first coating on the transducer region of the tape bearing surface; and a second coating on at least one of the outer regions of the tape bearing surface, the second coating being different than the first coating, wherein the first coating is harder than the second coating, wherein the second coating has a lower coefficient of sliding friction than the first coating.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

FIG. 9A is a partial top down view of a module according to one embodiment.

FIG. 9B is a partial cross-sectional view of a module taken along line 9B-9B of FIG. 9A.

FIG. 10A is a partial top down view of a module according to one embodiment.

FIG. 10B is a partial cross-sectional view of a module taken along line 10B-10B of FIG. 10A.

FIG. 11A is a partial top down view of a module according to one embodiment.

FIG. 11B is a partial cross-sectional view of a module taken along line 11B-11B of FIG. 11A.

DETAILED DESCRIPTION

The following description is made for the purpose of illustrating the general principles of the present invention and is not meant to limit the inventive concepts claimed herein. Further, particular features described herein can be used in Combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a module includes a plurality of transducers; a tape bearing surface having a transducer region aligned with the transducers in a tape travel direction, and outer regions flanking the transducer region in a direction perpendicular to the tape travel direction; a first coating on the transducer region of the tape bearing surface; and a second coating on at least one of the outer regions of the tape bearing surface, the second coating being different than the first coating.

In another general embodiment, module includes a plurality of transducers selected from a group consisting of data readers, servo readers, and data writers; a tape bearing surface having a transducer region aligned with the transducers in a tape travel direction, and outer regions flanking the transducer region in a direction perpendicular to the tape travel direction; a first coating on the transducer region of the tape bearing surface; and a second coating on at least one of the outer regions of the tape bearing surface, the second coating being different than the first coating, wherein the first coating is harder than the second coating, wherein the second coating has a lower coefficient of sliding friction than the first coating.

Figure 1:
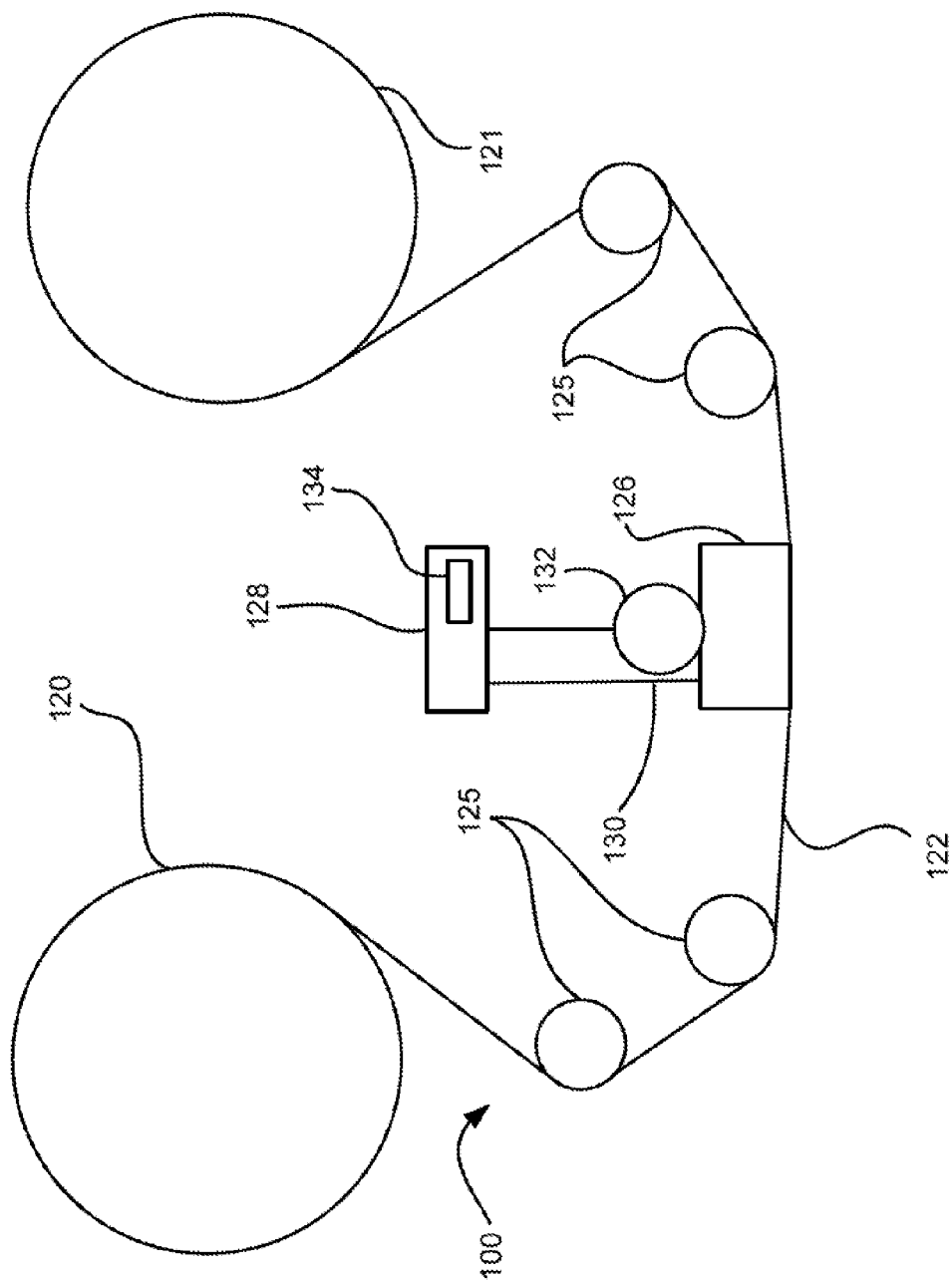
FIG. 1 is a schematic diagram of a simplified tape drive system according to one embodiment.

FIG. 1 illustrates a simplified tape drive 100 of a tape-based data storage system, which may be employed in the context of the present invention. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller assembly 128 via a cable 130. The controller 128 typically controls head functions such as servo following, writing, reading, etc. The controller may operate under logic known in the art, as well as any logic disclosed herein. The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive and a host (integral or external) to send and receive the data and for controlling the operation of the tape drive and communicating the status of the tape drive to the host, all as will be understood by those of skill in the art.

Figure 2:
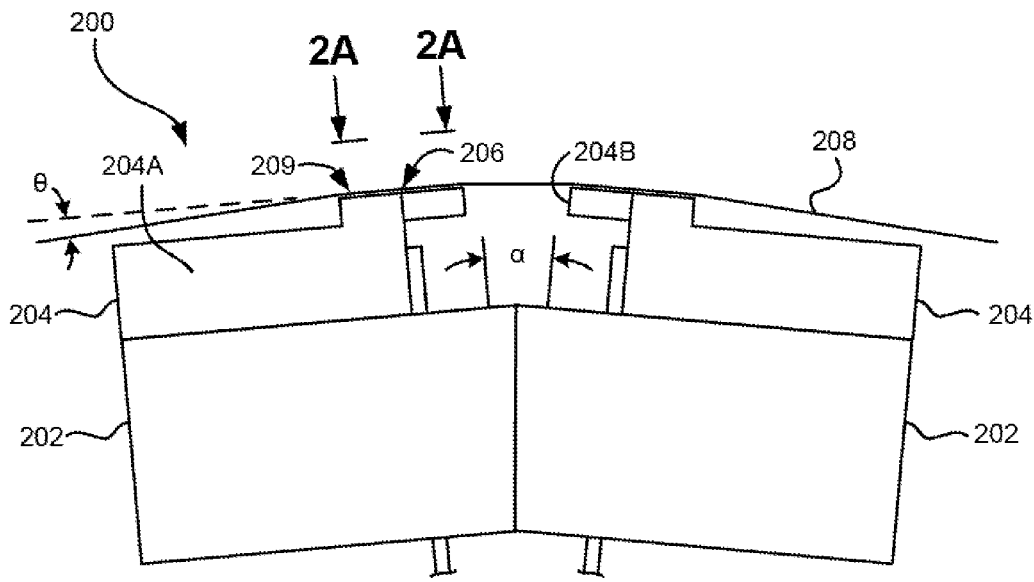
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback configuration. The readers and writers may also be arranged in an interleaved configuration. Alternatively, each array of channels may be readers or writers only. Any of these arrays may contain one or more servo track readers for reading servo data on the medium.

Figure 2A:
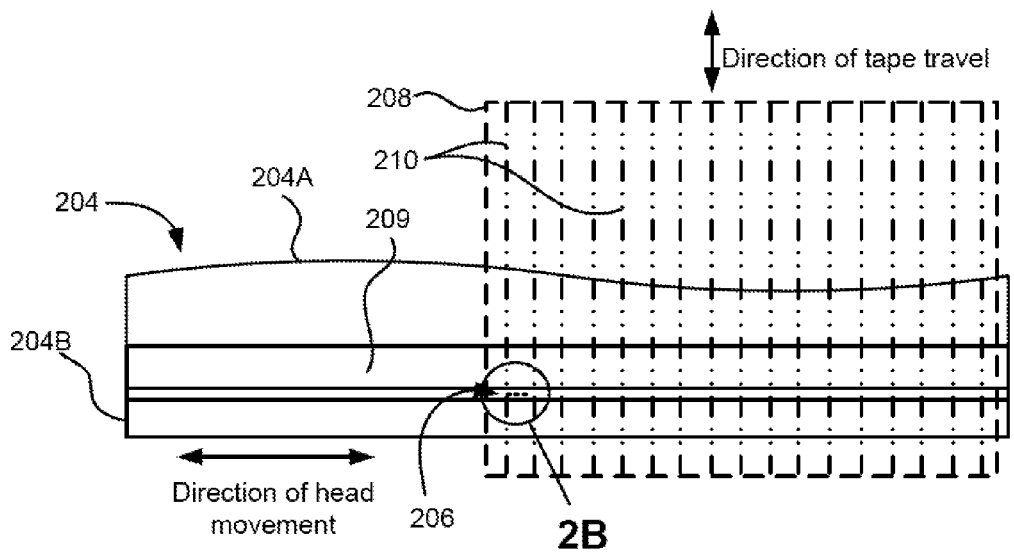
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
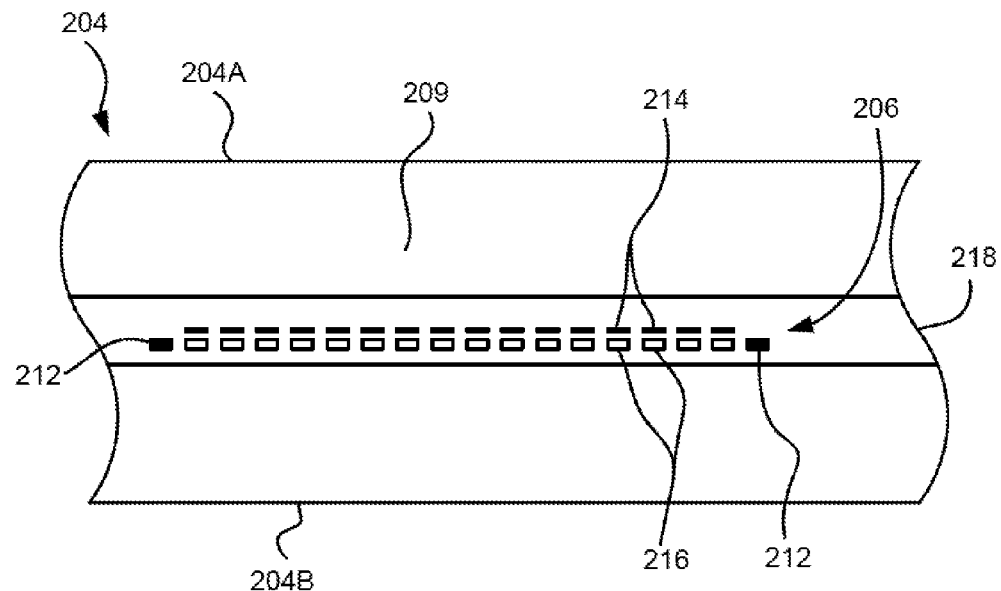
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 readers and/or writers 206 per array. A preferred embodiment includes 32 readers per array and/or 32 writers per array, where the actual number of transducing elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
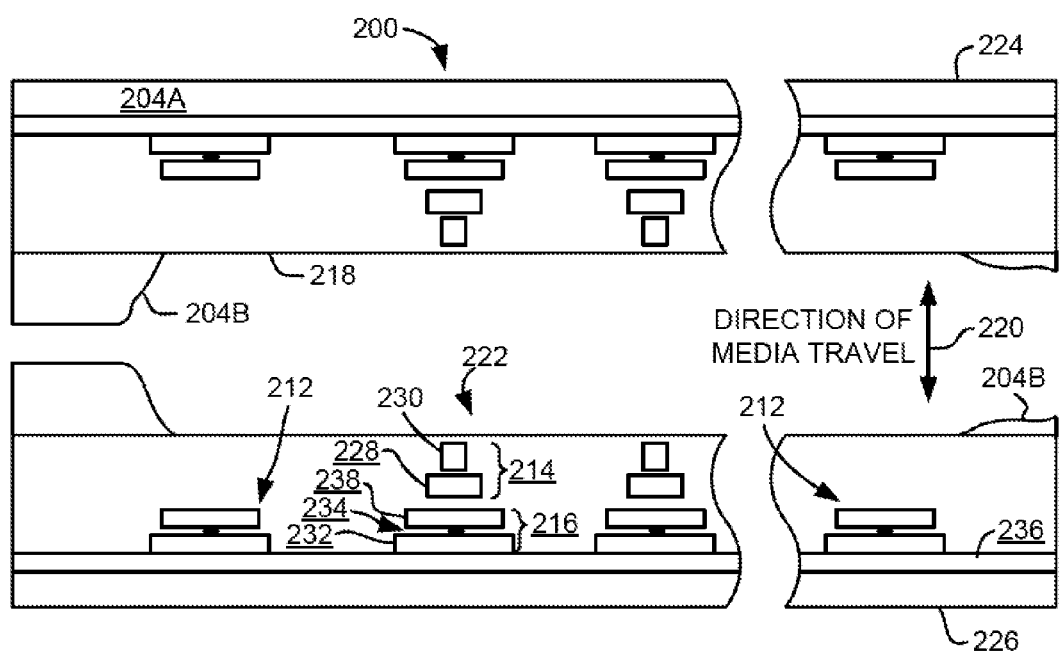
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
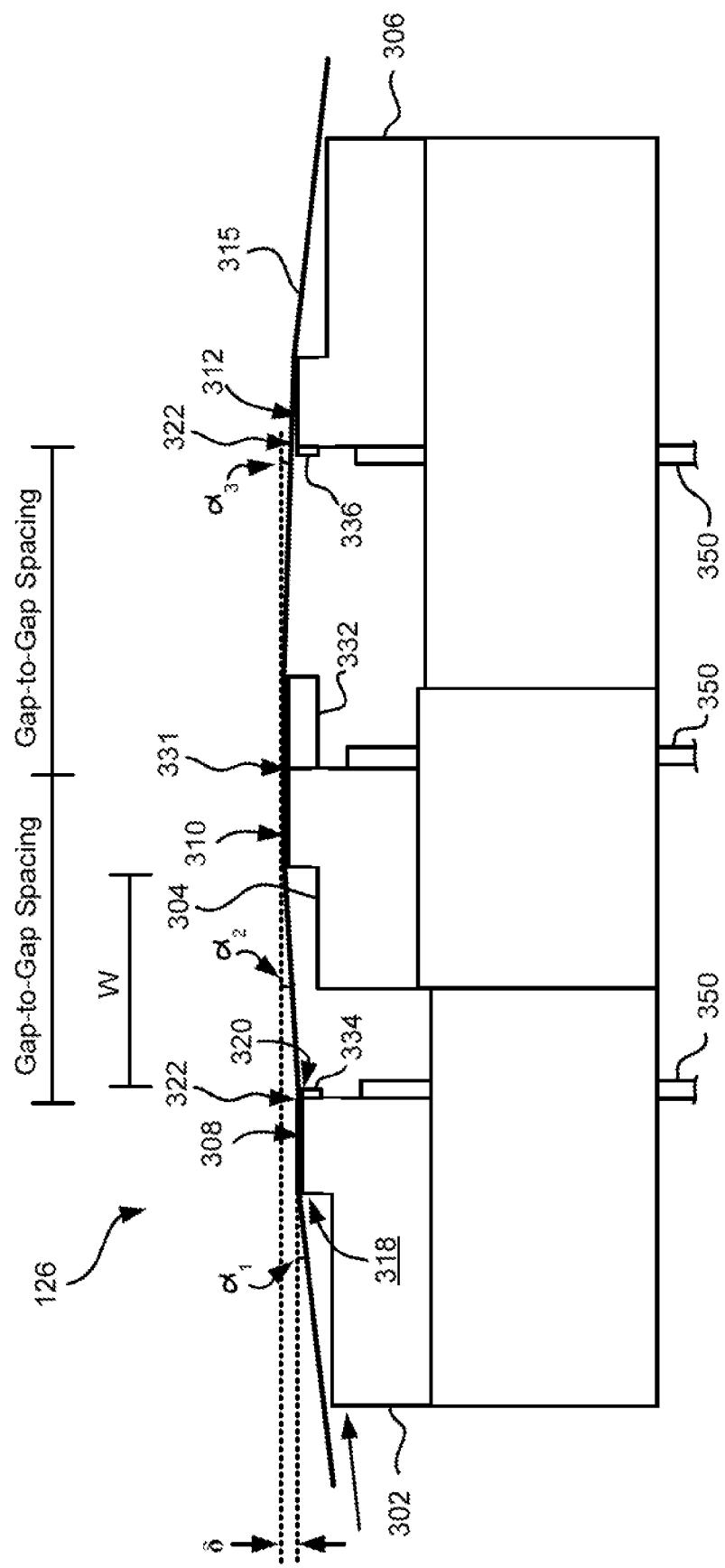
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules.

Also note that the outer modules 302, 306 will alternate as leading modules, depending on the direction of travel of the tape 315.

Figure 6:
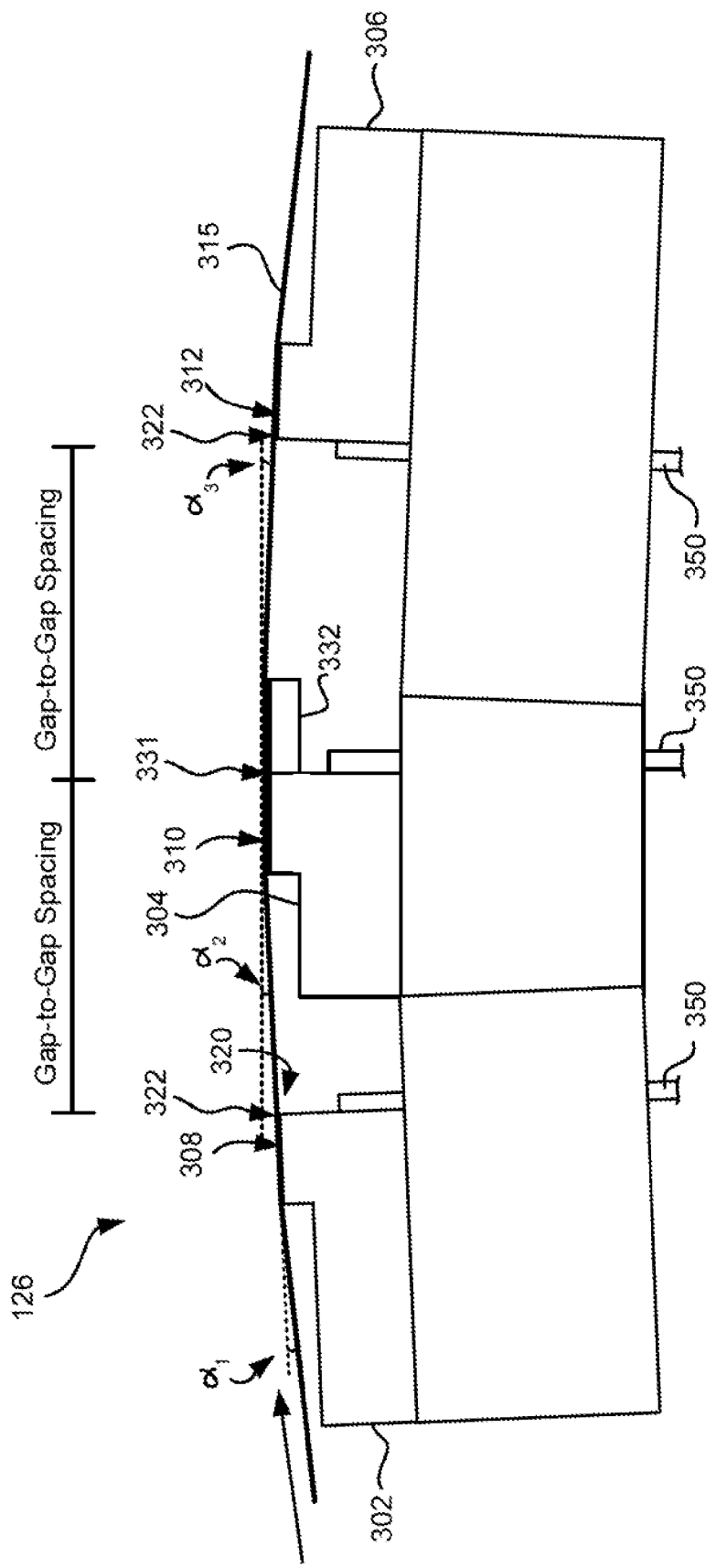
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce fiction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the tailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
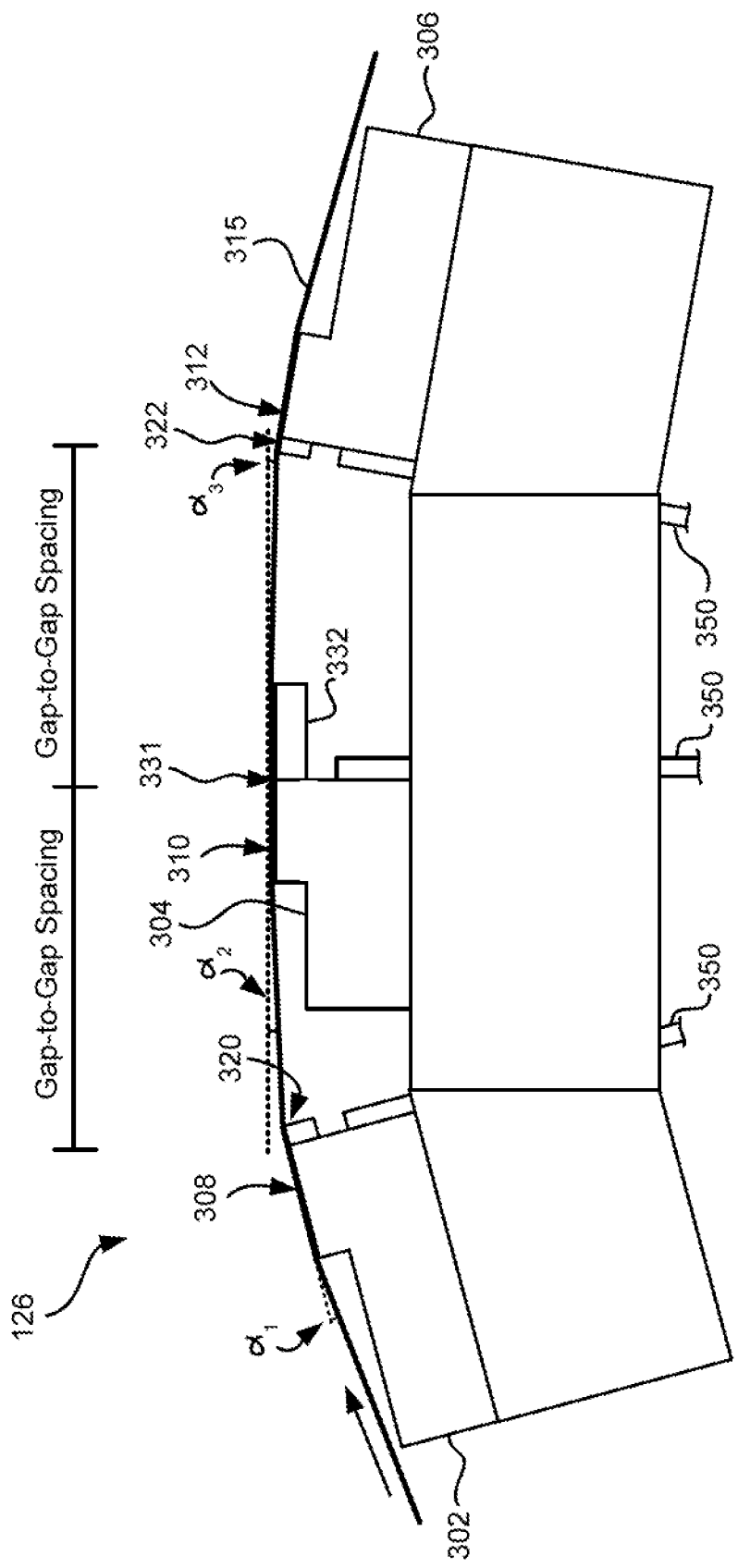
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same pitch as current 16 channel piggyback LTO modules, or alternatively the connections on the module may be organ-keyboarded for a 50% reduction in cable span. Over-under, writing pair unshielded cables can be used for the writers, which may have integrated servo readers.

The outer wrap angles $\alpha_1$ may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head can be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

Outer regions of a magnetic recording head may contribute significantly towards causing static and/or dynamic friction. The inventors attempted to control head media friction by incorporating beveling, with rough surface texturing (e.g., for stiction). However, such approaches were found potentially to have a higher susceptibility to debris contamination on the media. On the other hand, beveled surfaces incorporating smooth surface texturing having roughness less than approximately 20 nm resulted in unacceptable stiction. Moreover, in some three-module magnetic recording head configurations, beveling was found to have little benefit.

Conversely, while the regions of a magnetic recording head occupied by the transducers are relatively small compared to the outer regions, the more intimate tape contact needed for writing and reading tends to produce gap erosion and thus an increase in spacing. Being smaller, these regions near the transducers contribute less to friction than the larger outer regions. Transducer regions of the head are confined to a small space to minimize misregistration between transducers and tracks on tape due to tape dimensional changes that may occur after recording. Thus the tape is not perfectly dimensionally stable, and if the transducer region spanned the entire width of the tape, the outermost tracks would become even more misaligned with the tape as the dimensions of the tape fluctuate.

Some conventional approaches coat the entire head surface to help provide protection for the transducers. However, such coatings must provide a long lifetime, and are not designed for friction. Therefore, such embodiments tend to incorporate a thick coating which may be optimal for long life, but ultimately is undesirable due to the spacing losses it causes for the transducers. Moreover, such protective coatings must be smooth to mitigate the aforementioned spacing loss, but this results in extremely high running friction and stiction.

There have previously been no solutions which successfully address both mitigating friction losses as well as providing protection for the transducers with minimal spacing losses. Thus it would be desirable to provide a system and method which may achieve both improved friction characteristics, improved transducer protection, and minimal spacing loss.

Figure 8:
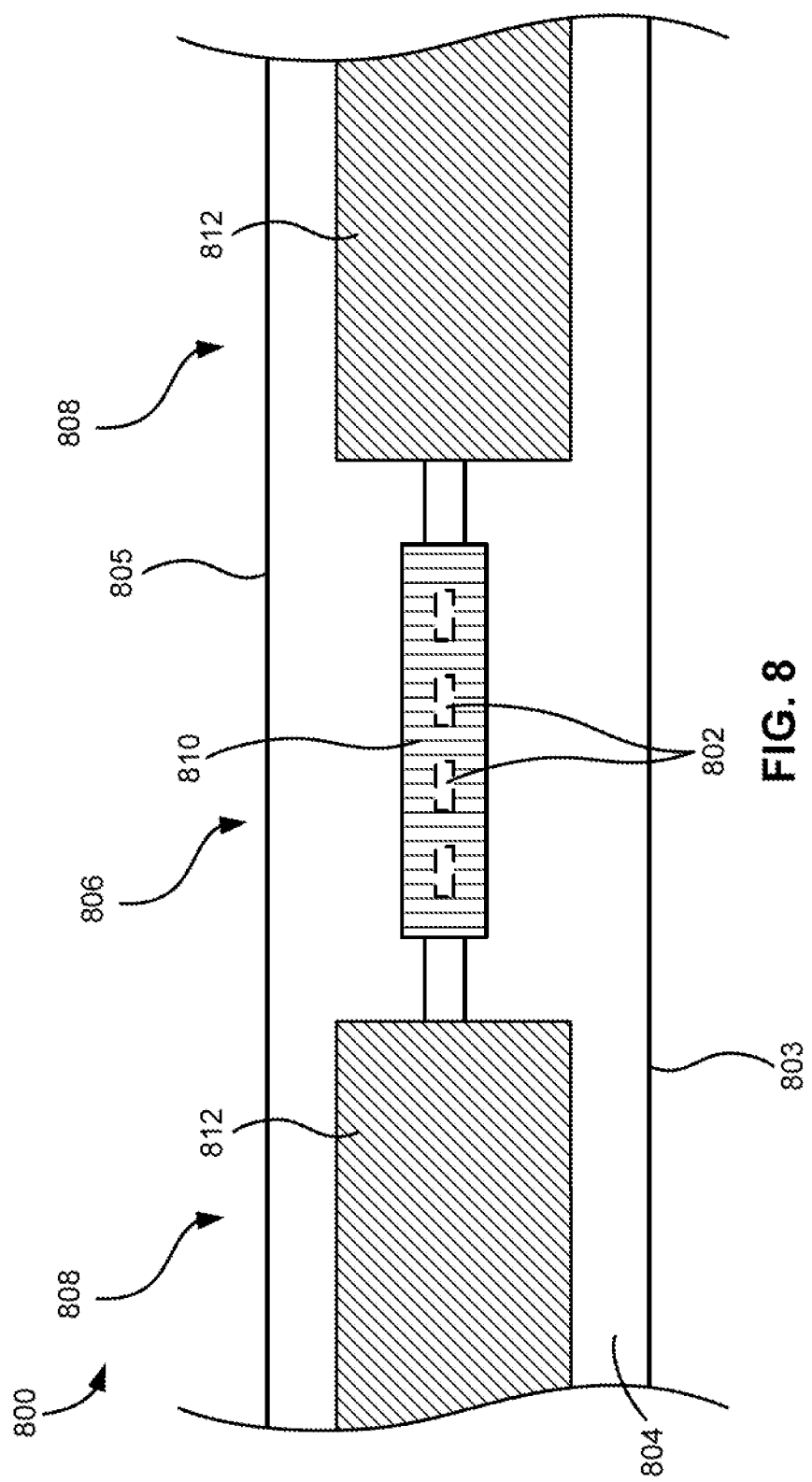
FIG. 8 is a partial top down view of a module according to one embodiment.

FIG. 8 depicts a module 800, in accordance with one embodiment. As an option, the present module 800 may be implemented in conjunction with features from any other embodiment listed herein, such as those described with reference to the other FIGS. Of course, however, such a module 800 and others presented herein may be used in various applications and/or in permutations which may or may not be specifically described in the illustrative embodiments listed herein. Further, the module 800 presented herein may be used in any desired environment.

In one illustrative embodiment as depicted in FIG. 8, a module 800 includes a plurality of transducers 802. According to various approaches, the transducers 802 may be selected from a group including data reader transducers, servo reader transducers, write transducers, piggyback read-write transducers, merged react-write transducers, etc. The module 800 further includes a substrate 803 and a closure 805.

The module 800 also includes a tape bearing surface 804 having a transducer region 806 generally aligned with at least the data transducers 802 in a tape travel direction. The module 800 additionally includes outer regions 808 flanking the transducer region 806 in a direction perpendicular to the tape travel direction.

In one approach, the leading end of the tape bearing surface may be shaped by beveling, as to reduce the running friction of the magnetic tape over the tape bearing surface. In various other approaches, the outer regions may be shaped by incorporating MOEMs, etc. prior to coating, as explained below.

With continued reference to FIG. 8, the module 800 includes a first coating 810 on the transducer region 806 of the tape bearing surface 804. The module 800 additionally includes a second coating 812 on at least one of the outer regions 808 of the tape bearing surface 804.

The coating may be applied by incorporating process steps known in the art. In an illustrative example, process steps may include defining the regions to be coated; applying a masking layer on the head surface using inkjet spay technology, metal mask, photolithography, etc.; ion milling; applying a coating material; removing masked regions e.g., lift off, etc.; etc.

According to various approaches, one or both of the coatings may be applied by incorporating the same, similar, or different processing than what is described and/or suggested herein.

In one approach, the coating in the outer regions may be optimized for both static and dynamic friction, such that shaping the head (e.g., beveling) may not be necessary to optimize performance. In an illustrative example, such a coating in the outer regions may be achieved by combining different coatings.

In a preferred illustrative approach, the first and second coatings may be applied in a "quilted" pattern with respect to the transducer region and the outer regions. For example, various embodiments may include the first and/or second coatings applied to a tape head in a patch-like design, e.g., islands, a strip or stripe in a direction perpendicular to the tape travel thereof, etc.; extending from a leading to a trailing edge of the tape bearing surface of the gap and/or module; extending for only a portion of the distance between the leading and hailing edges of the tape bearing surface of the gap and/or module; positioned such that a portion of or a whole transducer is exposed; etc.

Thus, in one approach, the second coating may be similar and/or the same as the first coating; however, in a preferred approach, the second coating may be different than the first coating. By including different coatings, it may be preferably possible to address the losses specific to a given region of the tape head.

In one approach, the second coating may preferably have a lower coefficient of sliding friction (i.e., is more slippery) than the first coating. Other approaches may have the same or a higher coefficient of sliding friction depending on the desired embodiment. According to various approaches, the second coating may include low friction coefficient carbons, fluorine compounds, fullerenes, low friction coefficient nitrides and oxides, etc. or any other material which would be apparent to one skilled in the art upon reading the present description.

It may be desirable to incorporate a second coating with a lower coefficient of sliding friction than the first coating to protect the tape head from wear due to friction. Thus, a lower coefficient of sliding friction may preferably optimize the effective lifetime of the tape head.

In further embodiments, more than two types of coatings may be used on a single module. Moreover, the multiple types of coatings may be used in the transducer region, in the outer regions, or both. Various configurations include laminates, damascene configurations, etc. For the present description, the first coating and the second coating may each be considered refer to a single respective type of coating, or may each refer to a combination of different types of coatings arranged in any manner that provides the characteristics desired for the particular embodiment.

Moreover, edges of the magnetic tape may cause excessive wear, debris accumulation and sound wave generation when run over the tape bearing surface at low tape speeds. The edges of the tape tend to cause more friction, thereby scarring the head in those areas. Therefore, in a preferred approach, the second coating may be formed thicker than the first coating, where the thickness is measured in a direction perpendicular to the tape bearing surface. In another approach, the second coating may have thicker portions in areas of the tape bearing surface corresponding to locations where tape edges align in each data band of the tape.

Moreover, the first coating may preferably be thinner than the second coating so as to minimize spacing losses, while also providing protection for the transducers. The second coating on the other hand, is not covering active transducers and so may be much thicker than the first coating without compromising tape head efficiency. However, the second coating may be as thin as, or thinner than, the first coating, depending on the desired embodiment.

According to another approach, the first coating may be preferably harder than the second coating, e.g., less prone to wear, which may lengthen the life of the transducers. However, depending on various desired embodiments, the first coating may be the same hardness, or softer than the second coating. According to various approaches, the first coating may include diamond like carbon (DLC), crystalline alumina, chrome oxide, etc. or any other material which would be apparent to one skilled in the art upon reading the present description.

The top down and cross-sectional views of FIGS. 9A-9B respectively, depict a module 900, in accordance with one embodiment. As an option, the present module 900 may be implemented in conjunction with features from any other embodiment listed herein, such as those described with reference to the other FIGS. Of course, however, such a module 900 and others presented herein may be used in various applications and/or in permutations which may or may not be specifically described in the illustrative embodiments listed herein. Further, the module 900 presented herein may be used in any desired environment.

Referring to FIGS. 9A-9B, a module 900, according to one embodiment, includes the first coating 810, which may be present on the transducer region 806 and at least one of the outer regions 808 of the tape bearing surface 804. In one approach, the first coating may be present in all areas of the tape bearing surface not occupied by the second coating.

FIGS. 10A-10B depict a module 1000, in accordance with one embodiment. As an option, the present module 1000 may be implemented in conjunction with features from any other embodiment listed herein, such as those described with reference to the other FIGS. Of course, however, such a module 1000 and others presented herein may be used in various applications and/or in permutations which may or may not be specifically described in the illustrative embodiments listed herein. Further, the module 1000 presented herein may be used in any desired environment.

According to the embodiment depicted in the top down and cross-sectional views of FIGS. 10A-10B respectively, one portion of the second coating 812 may be surrounded by the first coating 810 on at least one of the outer regions 808 of the tape bearing surface 804. In one approach, the first coating may be spaced apart from the portion of the second coating by a void, a third coating, etc.

In a variation, instead of the first coating adjacent the second coating 812 on the outer regions, a third coating that is different than the first and second coatings may be used. Additional types of coatings may also be used. Use of multiple different coatings allows optimization of characteristics of the overall coating scheme. For example, an extremely durable third material may be used in the outer regions to handle the increased wear sometimes observed in the areas that the tape edge runs.

FIGS. 11A-11B depict a module 1100, in accordance with one embodiment. As an option, the present module 1100 may be implemented in conjunction with features from any other embodiment listed herein, such as those described with reference to the other FIGS. Of course, however, such a module 1100 and others presented herein may be used in various applications and/or in permutations which may or may not be specifically described in the illustrative embodiments listed herein. Further, the module 1100 presented herein may be used in any desired environment.

In yet another alternate embodiment, a module 1100, as depicted in the top down and cross-sectional views of FIGS. 11A-11B respectfully, the second coating 812 may be located above the first coating 810 on at least one of the outer regions 808 of the tape bearing surface 804, as shown in the right hand side of FIGS. 11A and 11B, or the order may be reversed, as shown on the left hand side. According to various approaches, the second coating may be in direct contact with the first coating, separated by at least one insulating, adhesion and/or other layer.

In a variation of the foregoing embodiment, instead of the first coating above or below the second coating 812 on the outer regions, a third coating that is different than the first and second coatings may be used. Additional layers of the same or different coatings may also be used in the laminate structure. Use of multiple different coatings allows optimization of characteristics of the overall coating scheme. For example, an extremely durable third material may be used in the outer regions to handle the increased wear sometimes observed in the areas that the tape edge runs.

The embodiments described and/or suggested herein enable the ability to improve both the friction characteristics and the transducer protection of various magnetic recording heads.

A data storage system may include a module according to any of the approaches described and/or suggested herein. In another approach, the magnetic head may include at least two modules, at least three modules, multiple modules, etc. according to any of the approaches described and/or suggested herein. For example, the magnetic head may be similar to any of the magnetic heads described and/or suggested herein.

It will be clear that the various features of the foregoing methodologies and/or systems may be combined in any way, creating a plurality of combinations from the descriptions presented above.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A module, comprising:
    a plurality of transducers;
    a tape bearing surface having a transducer region aligned with the transducers in a tape travel direction, and outer regions flanking the transducer region in a direction perpendicular to the tape travel direction;
    a first coating on the transducer region of the tape bearing surface; and
    a second coating on at least one of the outer regions of the tape bearing surface, the second coating being different than the first coating,
    wherein either the first coating is present in all areas of the tape bearing surface not occupied by the second coating, or the first coating is spaced apart from the second coating and the tape bearing surface is continuous along a plane extending across the transducer region and outer regions.

2. A module as recited in claim 1, wherein the first coating is harder than the second coating.

3. A module as recited in claim 1, wherein the second coating has a lower coefficient of sliding friction than the first coating.

4. A module as recited in claim 1, wherein the second coating has a higher coefficient of sliding friction than the first coating.

5. A module as recited in claim 1, wherein the second coating is thicker than the first coating.

6. A module as recited in claim 1, wherein a portion of the second coating is thicker in areas of the tape bearing surface corresponding to locations where tape edges align in each data band.

7. A module as recited in claim 1, wherein a leading end of the tape bearing surface is beveled.

8. A module as recited in claim 1, wherein the first coating covers a media-facing side of at least one of the transducers.

9. A data storage system, comprising:
    a magnetic head having a module as recited in claim 1;

a drive mechanism for passing a magnetic medium over the magnetic head; and
a controller electrically coupled to the magnetic head.

10. A module, comprising:
a plurality of transducers;
a tape bearing surface having a transducer region aligned with the transducers in a tape travel direction, and outer regions flanking the transducer region in a direction perpendicular to the tape travel direction;
a first coating on the transducer region of the tape bearing surface; and
a second coating on at least one of the outer regions of the tape bearing surface, the second coating being different than the first coating,
wherein the first coating is also present on the at least one of the outer regions of the tape bearing surface.

11. A module as recited in claim 10, wherein the second coating is surrounded by the first coating on the at least one of the outer regions of the tape bearing surface.

12. A module as recited in claim 10, wherein the second coating is located above the first coating on the at least one of the outer regions of the tape bearing surface.

13. A module, comprising:
a plurality of transducers selected from a group consisting of data readers, servo readers, and data writers;
a tape bearing surface having a transducer region aligned with the transducers in a tape travel direction, and outer regions flanking the transducer region in a direction perpendicular to the tape travel direction;
a first coating on the transducer region of the tape bearing surface, the first coating covering a media-facing side of at least one of the transducers; and
a second coating on at least one of the outer regions of the tape bearing surface, the second coating being different than the first coating.

14. A module as recited in claim 13, wherein the second coating is thicker than the first coating.

15. A module as recited in claim 13, wherein the first coating is spaced apart from the second coating.

16. A module as recited in claim 13, wherein the first coating is also present on the at least one of the outer regions of the tape bearing surface.

17. A module as recited in claim 16, wherein the second coating is surrounded by the first coating on the at least one of the outer regions of the tape bearing surface.

18. A module as recited in claim 16, wherein the second coating is located above the first coating on the at least one of the outer regions of the tape bearing surface.

19. A module as recited in claim 13, wherein a portion of the second coating is thicker in areas of the tape bearing surface corresponding to locations where tape edges align in each data band.

20. A module as recited in claim 13, wherein the first coating present in all areas of the tape bearing surface not occupied by the second coating.

21. A module as recited in claim 13, wherein a leading end of the tape bearing surface is beveled.

22. A magnetic head, comprising at least two modules as recited in claim 13, wherein the first coating is harder than the second coating, wherein the second coating has a lower coefficient of sliding friction than the first coating.

23. A data storage system, comprising:
a magnetic head having a module as recited in claim 13;
a drive mechanism for passing a magnetic medium over the magnetic head; and
a controller electrically coupled to the magnetic head.

* * * * *